Figure 1:
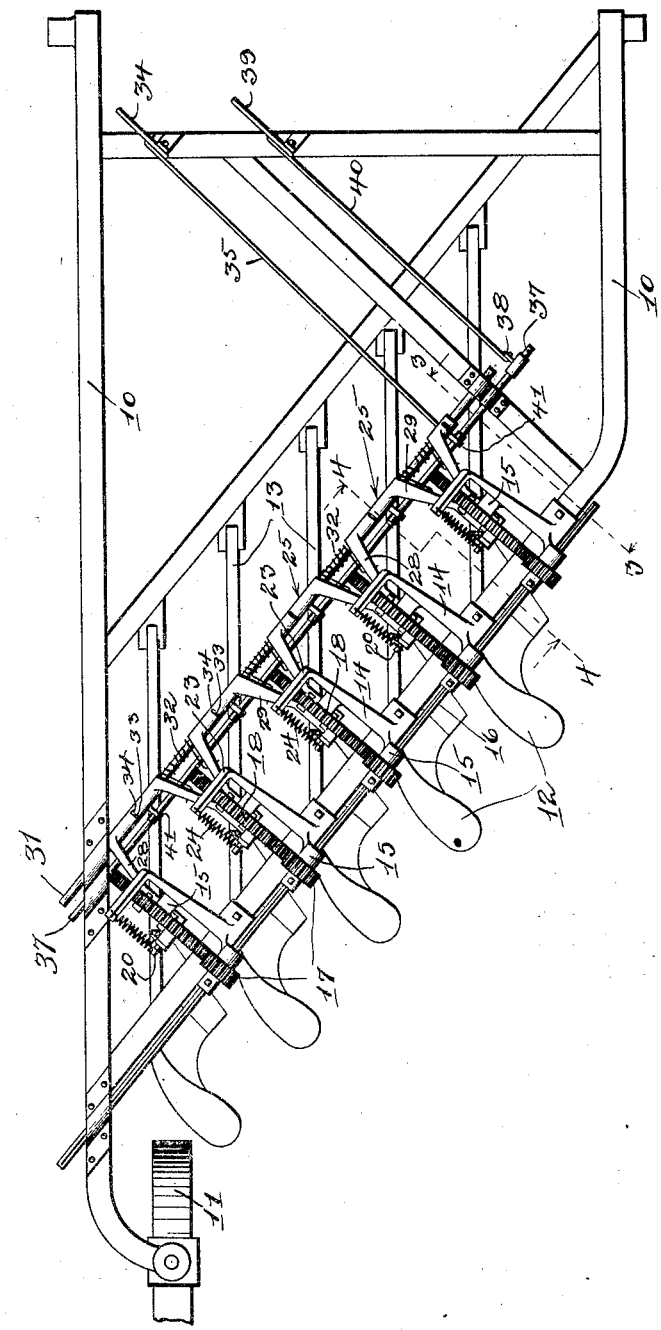

J. FROELICH.
PLOW LIFT FOR GANG PLOWS.
APPLICATION FILED JAN. 24, 1912.

1,056,532.

Patented Mar. 18, 1913.
2 SHEETS—SHEET 1.

Witnesses
F. C. Caswell
G. S. Hansen

Inventor
John Froelich
by John E. Stryker atty.

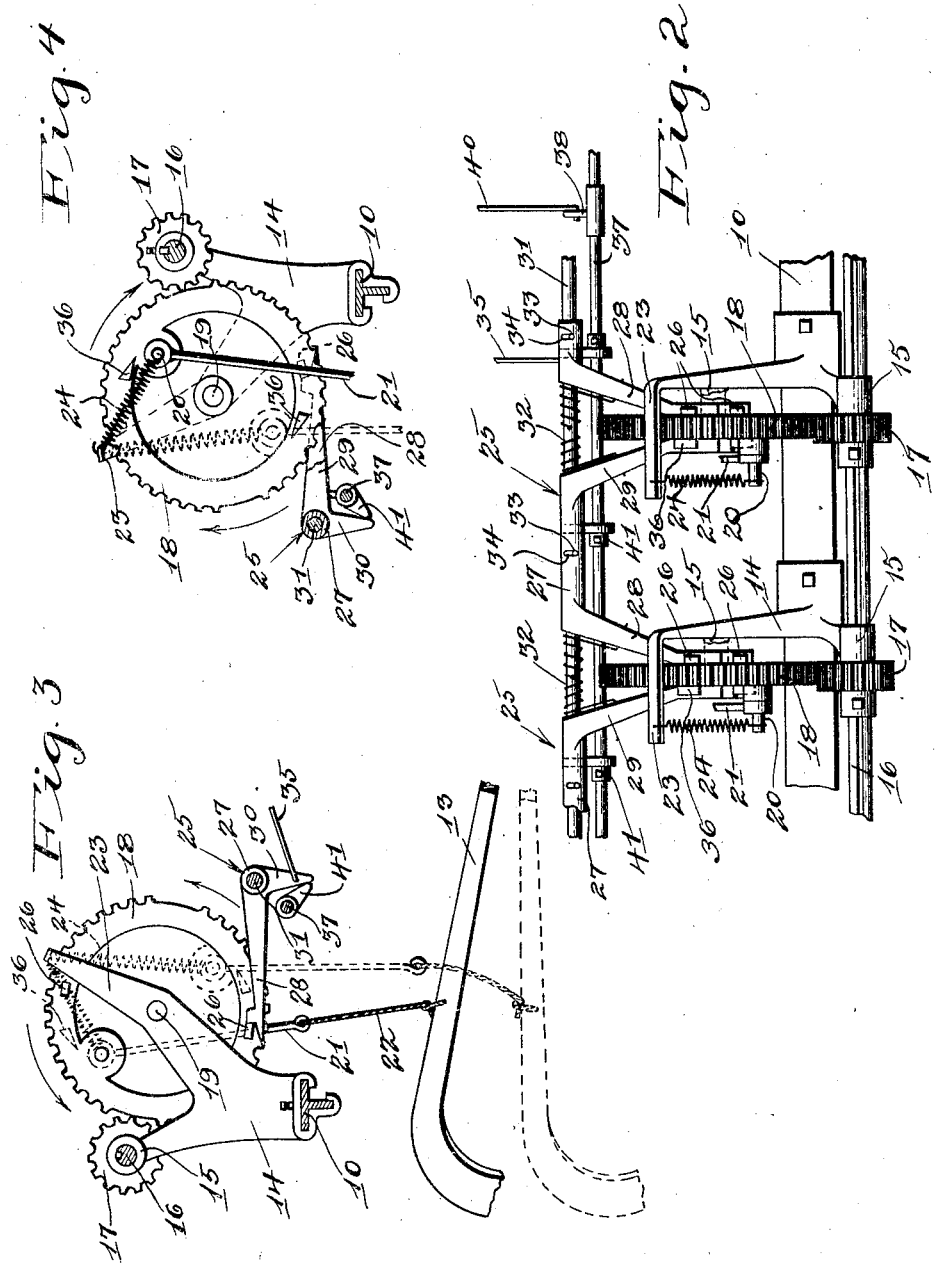

UNITED STATES PATENT OFFICE.

JOHN FROELICH, OF ST. PAUL, MINNESOTA, ASSIGNOR TO HACKNEY MANUFACTURING COMPANY, OF ST. PAUL, MINNESOTA, A CORPORATION OF MINNESOTA.

PLOW-LIFT FOR GANG-PLOWS.

1,056,532.  Specification of Letters Patent.  Patented Mar. 18, 1913.

Application filed January 24, 1912. Serial No. 673,199.

*To all whom it may concern:*

Be it known that I, JOHN FROELICH, a citizen of the United States, residing at St. Paul, in the county of Ramsey and State of Minnesota, have invented new and useful Improvements in Plow-Lifts for Gang-Plows, of which the following is a specification.

My invention relates to improvements in plow lifts. Its object is to provide a simple, durable and efficient power mechanism for raising and lowering a series of plows successively or collectively as desired.

In the drawings, Figure 1 is a plan view of my improved plow lift, shown in operative connection with a series of plows; Fig. 2 is a detail plan view showing part of the lifting mechanism; Fig. 3 is a detail sectional view taken on the line 3—3 of Fig. 1 and Fig. 4 is a detail sectional view taken on the line 4—4 of Fig. 1.

Referring to the accompanying drawings, the gang plow may comprise a frame 10, adapted to be connected at its forward end to a tractor or other vehicle and provided with a rear supporting wheel 11 and a series of plows 12 having their beams 13 adjustably and pivotally connected at their forward ends to said frame.

The plow lift is constructed as follows: The brackets 14 are slidably mounted on the frame 10 and provide bearings 15 in which the drive shaft 16 is journaled. This shaft is rotated by any suitable source of power (not shown) and is provided with drive gears 17 adjustably fixed thereon. The driven gears 18 are journaled on the stub shafts 19 in the brackets 14 and mesh with the drive gears 17. These driven gears are mutilated, *i. e.*, several teeth on arcs diametrically opposite each other, are absent, so that each of said gears may rest in two normal positions out of mesh with said drive gears. Each gear 18 is provided with a wrist pin 20, said pins being arranged in identical positions on said gears respectively. Connecting rods 21 are mounted on these pins, their free ends being connected by cables 22 to the plow beams 13. The bracket extensions 23 support the springs 24 which are connected to said wrist pins 20 on the gears 18. In one normal position of the driven gears the plows are lowered to permit their fall to proper working depth. In the other normal position the plows are secured in elevated and inoperative positions. The weight of the elevated plows on the gears 18 and the tension of the springs 24 thereon when the plows are lowered tend to rotate said gears forward as indicated by arrows in Figs. 3 and 4 of the drawings. To control this tendency to rotate, stops 25 are provided, engaging the lugs 26 on the gears 18 whereby said gears are held in their normal positions in disengagement from the drive gears 17. These stops consist of sleeves 27 having arms 28 and 29. Said sleeves, provided with levers 30, are slidable on the shaft 31 and journaled thereon in position with the arms 28 and 29 between adjacent faces of the driven gears 18. The shaft 31 is provided with springs 32 movable on said shaft for yieldingly holding the arms 28 and 29 in normal position and also with removable pins 33 extending through slots 34 in the sleeves 27 for limiting the movement of said sleeves and arms. The lever 30 on the stop 25, which locks the gear 18 to hold the leading plow, is connected to the hand lever 34 by the rod 35 and is operated thereby to disengage said stop from the lug 26 and release said gear wheel. When this wheel is released the weight of its connected plow or the tension of its spring 24 turns said gear and meshes it with its driving gear, whereby it is turned a half revolution to its next normal position, and locked by its stop 25. Each of the gears 18 is provided with two inclined trip lugs 36. These lugs are arranged to strike and move the arms 29, thus releasing the coacting arms 28 from the lugs 26 on the next succeeding gears 18. The lugs 36 are located on each gear in such positions relatively that when a gear is revolved, one of its trip lugs 36 releases (at the completion of its half revolution) the stop for the adjacent gear. Thus after the first stop 25 has been released by the hand lever 34, the remaining stops are released successively and the gears 18 are accordingly turned a half revolution to raise or lower the plows one after another. The rotation of the drive shaft 16 is regulated and the gears timed so that when the plows are lowered or raised in series, the furrows will begin or end on a straight line at right angles to said furrows.

I have also adapted this mechanism to raise and lower the entire gang of plows as a unit. The rocker-shaft 37 on the frame 10, is provided with an arm 38 connected with the hand lever 39 by a rod 40 and with cams 41 adjustable longitudinally thereon and respectively positioned adjacent to the arms 30 on the stops 25. The movement of these cams, by the manipulation of the lever 39, releases all of said stops at once and causes the simultaneous rotation of the gears 18 from one normal position to the other, thus raising or lowering the plows concurrently.

When it is desired to change the plows for larger or smaller ones, the brackets 14 are adjusted on the frame 10 to locate the gears 18 directly above the plow beams 13, the drive gears 17 are shifted to mesh with said driven gears, and the stops 25 together with the springs 32, pins 33 and cams 41 are also shifted to proper positions with respect to the gears 18.

What I claim as new and desire to protect by Letters Patent, is:

1. The combination with a suitably supported frame of a series of plows connected thereto, a plow lift comprising a plurality of driven gears on said platform, connecting rods between said gears and plows and power driven means for intermittently rotating said gears for raising and lowering said plows.

2. The combination with a suitably supported frame of a series of plows connected thereto, a plow lift comprising a plurality of power driven gears, connecting rods between said gears and plows, stops for locking the gears and means for successively releasing said gears whereby the plows are raised and lowered one at a time.

3. The combination with a suitably supported frame of a series of plows connected thereto, a plow lift comprising a plurality of power driven gears, connecting rods between said gears and plows, stops for locking the gears and means for simultaneously releasing said gears.

4. The combination with a suitably supported frame of a series of plows connected thereto, a plow lift comprising a continuously driven shaft, a series of drive gears on said shaft, a series of driven gears adapted to mesh with said drive gears, connecting rods between said driven gears and plows, stops for locking each of said gears, means for manually releasing the first driven gear of the series, and means on each of said gears for releasing its adjacent driven gear.

5. The combination with a suitably supported frame of a series of plows connected thereto, a plow lift comprising a series of drive gears, a series of mutilated driven gears arranged to mesh with said drive gears and adapted to revolve intermittently, substantially a half revolution at a time, connecting rods between said driven gears and plows, stops for locking said gears, means for releasing said gears and means for throwing said drive and driven gears into mesh.

6. The combination with a suitably supported frame of a series of plows connected thereto, a plow lift comprising a series of drive gears, a series of driven gears with teeth omitted on arcs diametrically opposite each other, stops for locking and means for releasing said gears, connecting rods between said gears and plows, and springs supported on the frame in connection with the driven gears, said rods and springs being adapted to impart an initial movement to said driven gears for intermeshing the same with said drive gears.

7. The combination with a suitably supported frame of a series of plows connected thereto, a plow lift comprising a series of drive gears, a series of driven gears adapted to mesh with said drive gears and having teeth omitted on arcs diametrically opposite each other, lugs on said driven gears, stops for engaging said lugs to lock said gears in position out of mesh with said drive gears, means for manually releasing one of said driven gears, connecting rods between said gears and plows, springs supported on the frame in connection with the driven gears, said rods and springs being adapted to impart an initial movement to said gears when released, and means for releasing the adjacent driven gear as the preceding gear completes a half revolution.

8. The combination with a suitably supported frame of a series of plows connected thereto, a plow lift comprising a series of drive gears, a series of driven gears adapted to mesh with said drive gears and having teeth omitted on arcs diametrically opposite each other, lugs on said gears, stops for engaging said lugs to lock said gears in positions out of mesh with said drive gears, means for simultaneously releasing said driven gears, connecting rods between said driven gears and plows, springs supported on the frame in connection with the driven gears, said rods and springs being adapted to impart an initial movement to the driven gears when released.

9. The combination with a suitably supported frame of a series of plows connected thereto, a plow lift comprising a series of drive gears, a series of driven gears adapted to mesh with said drive gears and having teeth omitted on arcs diametrically opposite each other, lugs on said gears, stops for engaging said lugs to lock said gears in positions out of mesh with said drive gears, a series of cams adapted to engage said stops, a hand lever for simultaneously operating said cams to disengage said lugs and stops, connecting rods between said driven gears and plows, and springs supported on the frame in connection with the driven gears, said rods and springs being adapted to impart an initial movement to said driven gears whereby said drive and driven gears are intermeshed.

10. The combination with a suitably supported frame, of a series of plows connected thereto, a plow lift comprising a continuously driven shaft, a series of drive gears adjustable on said shaft, a series of mutilated driven gears, slidable on said frame and in mesh with said drive gears, said driven gears being adapted to revolve intermittently substantially a half revolution at a time, connecting rods between said driven gears and plows, adjustable stops for locking said gears, means for releasing said gears, and means for throwing said drive and driven gears into mesh.

11. The combination with a suitably supported platform, of a series of plows connected thereto, a plow lift comprising a plurality of power driven gears, connecting rods between said gears and plows, a stop for each gear and means for successively or simultaneously releasing said gears to raise and lower said plows singly or collectively.

12. A lift for gang plows comprising a series of suitably supported shafts, a power driven member revoluble on each shaft, connecting rods arranged respectively between the members and plows, a stop for each member and means for simultaneously disconnecting said stops from said members.

13. A lift for gang plows comprising a plurality of power driven members, rods connecting said members with the different individual plows, a shaft carrying stops to lock said members and a second shaft carrying cams to simultaneously shift said stops and release said members.

In testimony whereof, I have signed my name to this specification in the presence of two subscribing witnesses.

JOHN FROELICH.

Witnesses:
F. C. CASWELL,
G. S. HANSEN.

Copies of this patent may be obtained for five cents each, by addressing the "Commissioner of Patents, Washington, D. C."